United States Patent
Wadsworth et al.

(10) Patent No.: US 9,780,910 B2
(45) Date of Patent: Oct. 3, 2017

(54) SYSTEMS AND METHODS FOR MULTIPLE STREAM ENCODED DIGITAL VIDEO

(71) Applicant: HARRIS CORPORATION, Melbourne, FL (US)

(72) Inventors: Michael Wadsworth, Palmyra, NY (US); Brian Padalino, Rochester, NY (US); Brent Josefiak, Rochester, NY (US)

(73) Assignee: HARRIS CORPORATION, Melbourne, FL (US)

( * ) Notice: Subject to any disclaimer, the term of this patent is extended or adjusted under 35 U.S.C. 154(b) by 503 days.

(21) Appl. No.: 13/803,688

(22) Filed: Mar. 14, 2013

(65) Prior Publication Data

US 2014/0269937 A1 Sep. 18, 2014

(51) Int. Cl.
| | |
|---|---|
| *H04N 21/63* | (2011.01) |
| *H04L 1/00* | (2006.01) |
| *H04N 21/2343* | (2011.01) |
| *H04N 21/2383* | (2011.01) |
| *H04N 19/30* | (2014.01) |

(52) U.S. Cl.
CPC ....... *H04L 1/0003* (2013.01); *H04N 21/2383* (2013.01); *H04N 21/234327* (2013.01); *H04N 21/631* (2013.01); *H04L 2001/0098* (2013.01); *H04N 19/30* (2014.11)

(58) Field of Classification Search
CPC ........... H04N 1/00424; H04N 1/00018; H04N 1/002; H04N 1/00321; H04H 20/30; H04H 20/42; H04H 20/71; H04B 1/38
USPC .................................................. 375/240.26
See application file for complete search history.

(56) References Cited

U.S. PATENT DOCUMENTS

| | | | | |
|---|---|---|---|---|
| 6,798,838 B1* | 9/2004 | Ngo | ...................... | H04L 1/0003 348/E5.003 |
| 2002/0118743 A1* | 8/2002 | Jiang | ...................... | H04N 19/29 375/240.01 |
| 2004/0018855 A1* | 1/2004 | Wallace | ............... | H04B 7/0669 455/561 |
| 2005/0169395 A1* | 8/2005 | Monta | ................. | H04L 27/2637 375/261 |

(Continued)

FOREIGN PATENT DOCUMENTS

EP  2393227  12/2011

OTHER PUBLICATIONS

Muhammad, "Use-case for incremental redundancy and further simulation results", CCI telco #15, Sony, Jan. 2011, pp. 1-18.

*Primary Examiner* — Mohammed Rahaman
*Assistant Examiner* — Jimmy S Lee
(74) *Attorney, Agent, or Firm* — Allen, Dyer, Doppelt + Gilchrist, P.A.

(57) ABSTRACT

The digital video communications device includes a scalable video coding (SVC) controller including an encoder and associated block equalizer. The encoder is configured to receive digital video, and encode received digital video into a plurality of related streams including a base layer having a first modulation type, and scaled enhancement layers having different modulation types. The block equalizer is configured to generate a waveform by sequentially interleaving the plurality of related streams with equalizer probes. The digital video transmission approach allows the receiver to automatically provide the best video quality that the channel will support without negotiation with the transmitter.

23 Claims, 3 Drawing Sheets

(56) References Cited

U.S. PATENT DOCUMENTS

2010/0074341 A1* 3/2010 Wan .................. H04N 19/46
375/240.26
2011/0012992 A1* 1/2011 Luthra ............... H04N 13/0048
348/43
2011/0237205 A1 9/2011 Nieto et al.

* cited by examiner

SYSTEMS AND METHODS FOR MULTIPLE STREAM ENCODED DIGITAL VIDEO

FIELD OF THE INVENTION

The present invention relates to the field of communications, and, more particularly, to digital video communications and related methods.

BACKGROUND OF THE INVENTION

H.264/MPEG-4 Part 10 or AVC (Advanced Video Coding) is a standard for video compression, and is currently one of the most commonly used formats for the recording, compression, and distribution of high definition video. H.264/MPEG-4 AVC is a block-oriented motion-compensation-based codec standard developed by the ITU-T Video Coding Experts Group (VCEG) together with the International Organization for Standardization (ISO)/International Electrotechnical Commission (IEC) joint working group, the Moving Picture Experts Group (MPEG). The product of this partnership effort is known as the Joint Video Team (JVT). The ITU-T H.264 standard and the ISO/IEC MPEG-4 AVC standard are jointly maintained so that they have identical technical content.

H.264 is perhaps best known as being one of the codec standards for Blu-ray Discs; all Blu-ray Disc players must be able to decode H.264. It is also widely used by streaming internet sources, such as videos from Vimeo, YouTube, and the iTunes Store, web software such as the Adobe Flash Player and Microsoft Silverlight, and also various HDTV broadcasts over terrestrial (ATSC, ISDB-T, DVB-T or DVB-T2), cable (DVB-C) and satellite (DVB-S and DVB-S2).

Specified in Annex G of H.264/AVC, SVC allows the construction of bitstreams that contain sub-bitstreams that also conform to the standard, including one such bitstream known as the "base layer" that can be decoded by a H.264/AVC codec that does not support SVC. Temporal bitstream scalability includes the presence of a sub-bitstream with a smaller temporal sampling rate than the main bitstream, while spatial and quality bitstream scalability includes the presence of a sub-bitstream with lower spatial resolution/quality than the main bitstream.

Analog video transmissions degrade gracefully and allow for a lower quality video to be displayed based on signal-to-noise ratio (SNR) and receiver performance. However, digital video transmissions suffer from the brick wall effect of other digital transmissions. Multicast video transmissions typically try to transmit for the least common denominator, which might not be the majority of users and degrade video beyond what the majority of users can receive.

Current approaches include single transmission of the most robust stream which causes degradation for all users. Multiple transmissions would typically use excess bandwidth. A parallel tone modem may fix pilots to certain modulation types but it may suffer from high peak-to-average power ratio ("PAPR"), and is susceptible to frequency selective fading. Also, unequal coding such that more significant bits are encoded stronger than less significant bits may require a new modulation scheme requiring a significant modem change, and for a single H.264 stream, no single bit is more important than the rest due to excessive compression.

SUMMARY OF THE INVENTION

In view of the foregoing background, it is therefore an object of the present invention to provide a digital video transmission approach that allows the receiver to provide the video quality that the channel will support, such as without negotiation with the transmitter.

This and other objects, features, and advantages in accordance with the present invention are provided by a digital video communications device including a scalable video coding (SVC) controller including an encoder and associated block equalizer. The encoder is configured to receive digital video, and encode received digital video into a plurality of related streams including a base layer having a first modulation type, and scaled enhancement layers having different modulation types. The block equalizer is configured to generate a waveform by sequentially interleaving the plurality of related streams with equalizer probes.

The scaled enhancement layers may be spatially scaled (i.e. with respect to resolution), temporally scaled (i.e. with respect to framerate) and/or fidelity scaled (i.e. with respect to signal-to-noise ratio (SNR)).

Another aspect is directed to a digital video communications system including a transmitting unit comprising a digital video source and a scalable video coding (SVC) controller configured to receive digital video from the digital video source, and encode received digital video into a plurality of related streams including a base layer having a first modulation type, and scaled enhancement layers having different modulation types. The SVC controller also generates a waveform by sequentially interleaving the plurality of related streams with equalizer probes. A receiving unit is configured to receive the waveform and includes a receiver, associated demultiplexer and a plurality of output buffers. The receiver is configured to independently decode each of the related streams of the waveform, and the demultiplexer is configured to divide the decoded related streams into respective output buffers.

A method aspect is directed to a digital video communications method including providing a scalable video coding (SVC) controller having an encoder and associated block equalizer. The method includes receiving digital video at the encoder, and encoding the received digital video into a plurality of related streams including a base layer having a first modulation type, and scaled enhancement layers having different modulation types. A waveform is generated at the block equalizer by sequentially interleaving the plurality of related streams with equalizer probes.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
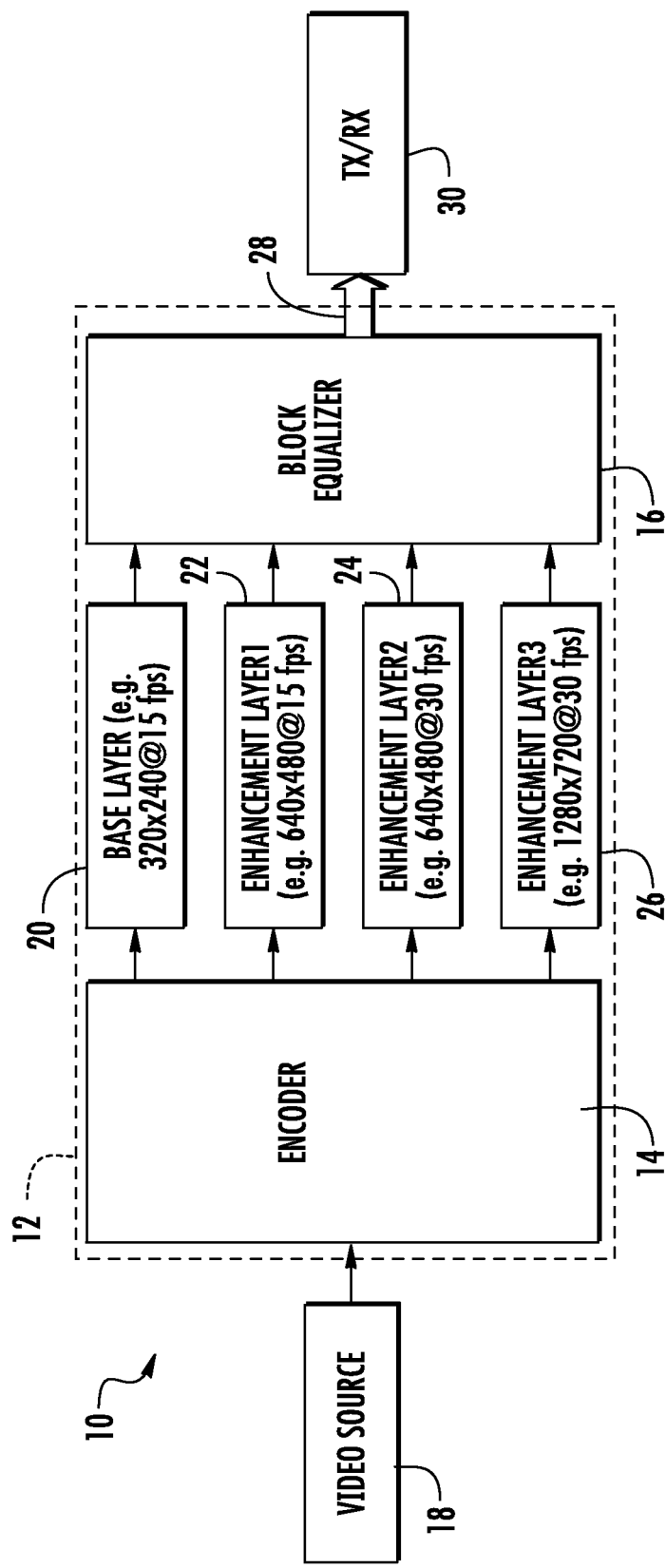
FIG. 1 is a schematic block diagram illustrating an embodiment of a digital video communications device in accordance with features of the present invention.
Figure 2:
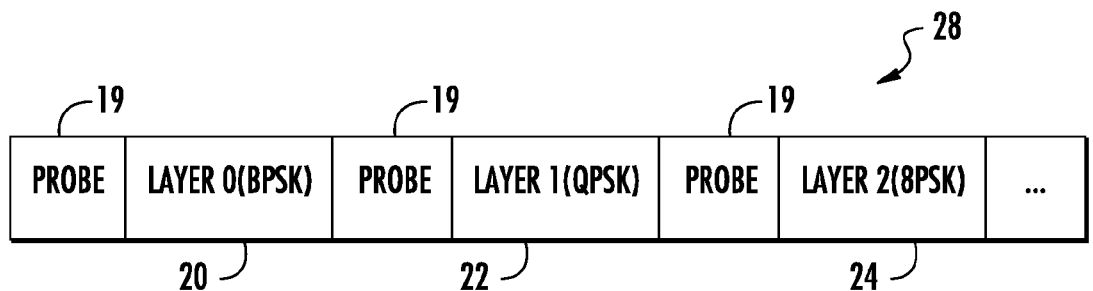
FIG. 2 is a schematic diagram illustrating an example of a waveform generated by the digital video communications device of FIG. 1.

Referring initially to FIGS. 1 and 2, a digital video communications device 10 will be described. The device 10 includes a scalable video coding (SVC) controller 12 including an encoder 14 and associated block equalizer 16. The encoder 14, e.g. an H.264/MPEG-4 SVC encoder, is configured to receive digital video, and encode received digital video into a plurality of related streams 20, 22, 24, 26 including a base layer having a first modulation type, and scaled enhancement layers having different modulation types. A digital video source 18, such as a YUV or RGB camera, or video database, provides the digital video to the SVC controller 12.

Hardware and software H.264 SVC encoders are available commercially which can produce many streams of video and are extremely configurable.

The block equalizer 16 is configured to generate a waveform 28 by sequentially interleaving the plurality of related streams 20, 22, 24, 26 with equalizer probes 19. The equalizer probes 19 are modulation independent and comprise a known sequence of bits, as would be appreciated by those skilled in the art. A wireless transceiver 30 or modem is configured to transmit the waveform 28. A transceiver may be a unit which includes both a receiver and a transmitter.

Direct broadcast satellite, WiFi, and mobile phones all use modems to communicate, as do most other wireless services today. Modern telecommunications and data networks also make extensive use of radio modems. Even where a cable is installed, it is often possible to get better performance or make other parts of the system simpler by using radio frequencies and modulation techniques through a cable. Coaxial cable has a very large bandwidth, however signal attenuation becomes a major problem at high data rates if a baseband digital signal is used. By using a modem, a much larger amount of digital data can be transmitted through a single piece of wire. Digital cable television and cable Internet services use radio frequency modems to provide the increasing bandwidth needs of modern households.

The first modulation type and the different modulation types may comprise different modulation and coding schemes (MCS) and/or include a plurality of phase-shift keying (PSK) digital modulation schemes and/or quadrature-amplitude modulation (QAM) schemes. For example, as illustrated, the base layer 20 (or Layer 0) includes binary phase shift keying (BPSK), while enhancement layer1 22 (or Layer 1) includes quadrature phase shift keying (QPSK). As such, the enhancement layer2 24 (or Layer 2) includes 8PSK, while the enhancement layer3 26 includes 16QAM.

As an example, the highest enhancement layer 26 may be 720p where the base layer 20 is QVGA at 15 fps. Both layers are very usable video, but vary widely in bitrate. However, any type of modulation and coding scheme can be used. The same bits do not have to be literally transmitted unadulterated. For example, only after equalization and FEC at the receiver do the same bits come back out. Moreover, as an example, Layer 0 might be BPSK at r=⅓ FEC rate, whereas Layer 1 might be BPSK at r=¾ FEC rate.

Phase-shift keying (PSK) is a digital modulation scheme that conveys data by changing, or modulating, the phase of a reference signal (the carrier wave). Any digital modulation scheme uses a finite number of distinct signals to represent digital data. PSK uses a finite number of phases, each assigned a unique pattern of binary digits. Usually, each phase encodes an equal number of bits. Each pattern of bits forms the symbol that is represented by the particular phase.

BPSK (also sometimes called PRK, Phase Reversal Keying, or 2PSK) is the simplest form of phase shift keying (PSK). It uses two phases which are separated by 180°. This modulation is the most robust of all the PSKs since it takes the highest level of noise or distortion to make the demodulator reach an incorrect decision.

QPSK is sometimes referred to as quaternary PSK, quadriphase PSK, 4-PSK, or 4-QAM (although the root concepts of QPSK and 4-QAM are different, the resulting modulated radio waves are the same). With four phases, QPSK can encode two bits per symbol to minimize the bit error rate (BER).

Any number of phases may be used to construct a PSK constellation but 8-PSK is usually the highest order PSK constellation used. With more than 8 phases, the error-rate becomes high and there may be better, though more complex, modulations available such as quadrature amplitude modulation (QAM). Although any number of phases may be used, the fact that the constellation usually deals with binary data means that the number of symbols is usually a power of 2, this allows an equal number of bits-per-symbol.

Quadrature amplitude modulation (QAM) is another digital modulation scheme. It conveys two digital bit streams, by modulating the amplitudes of two carrier waves, using the amplitude-shift keying (ASK) digital modulation scheme. The two carrier waves, usually sinusoids, are out of phase with each other by 90° and are thus called quadrature carriers or quadrature components. The modulated waves are summed, and the resulting waveform is a combination of both phase-shift keying (PSK) and amplitude-shift keying (ASK). In the digital QAM case, a finite number of at least two phases and at least two amplitudes are used.

PSK modulators are often designed using the QAM principle, but are not considered as QAM since the amplitude of the modulated carrier signal is constant. QAM is used extensively as a modulation scheme for digital telecommunication systems. High spectral efficiencies can be achieved with QAM by setting a suitable constellation size, limited only by the noise level and linearity of the communications channel.

Other digital modulation and coding schemes may also be used as would be appreciated by those skilled in the art.

The scaled enhancement layers may be spatially scaled (i.e. with respect to resolution), temporally scaled (i.e. with respect to framerate) and/or fidelity scaled (i.e. with respect to signal-to-noise ratio (SNR)). Digital video is encoded into multiple streams which are related to each other (e.g. H.264/Scalable Video Coding). Some overhead may be incurred (e.g. 10%-20%), but since each layer is related to each other the approach ends up being more efficient than transmitting N unrelated streams. Similar to analog video, the burden is pushed to the receiver.

Figure 3:
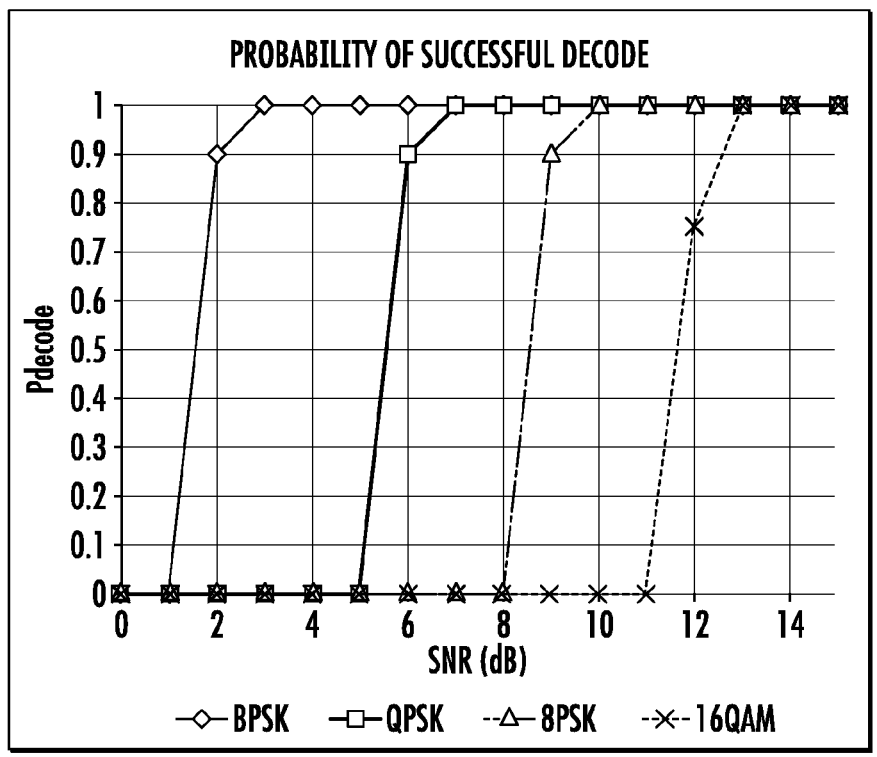
FIG. 3 is a chart illustrating the probability of successful decoding of the waveform of FIG. 2.
Figure 4:
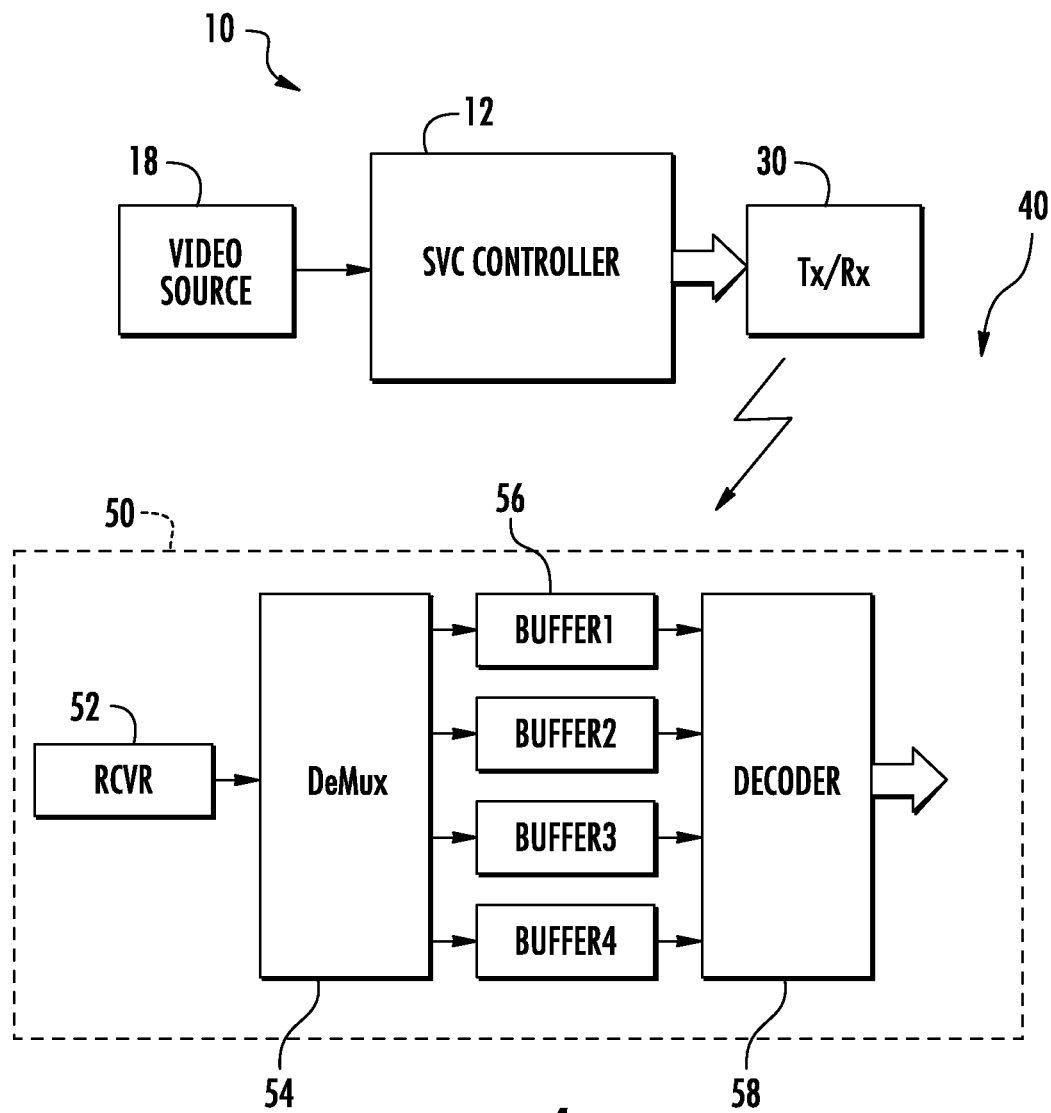
FIG. 4 is a schematic block diagram illustrating an embodiment of a digital video communications system in accordance with features of the present invention.

Referring to FIG. 3, the chart illustrates the probability of successful decoding of the waveform of FIG. 2. Higher spectral efficiency requires higher SNR and therefore has higher throughput for higher framerate, larger resolution video, etc. Lower spectral efficiency are more robust, but sacrifice framerate or resolution for base layer. The receiver decodes each layer from each modulation independently and combines all correctly received layers for best and optimal video performance. The present approach retains low latency and time diversity by interleaving layers instead of grouping in a single contiguous transmission.

Another aspect is directed to a digital video communications system 40 that includes the device 10 or transmitting unit comprising a digital video source 18 and a scalable video coding (SVC) controller 12 (described above) configured to receive digital video from the digital video source 18, and encode received digital video into a plurality of related streams including a base layer having a first modulation type, and scaled enhancement layers having different modulation types. The SVC controller 12 also generates a waveform 28 by sequentially interleaving the plurality of related streams 20, 22, 24, 26 with equalizer probes 19. Transceiver 30 or modem transmits the waveform 28 over a communications channel.

A receiving unit 50 is configured to receive the waveform 28 and includes a receiver 52, associated demultiplexer 54 and a plurality of output buffers 56. The receiver 52 is configured to independently decode each of the related streams of the waveform 28, and the demultiplexer 54 is configured to divide the decoded related streams into respective output buffers 56.

A method aspect is directed to a digital video communications method including providing a scalable video coding (SVC) controller 12 having an encoder 14 and associated block equalizer 16. The method includes receiving digital video at the encoder 14, and encoding the received digital video into a plurality of related streams 20, 22, 24, 26 including a base layer having a first modulation type, and scaled enhancement layers having different modulation types. A waveform 28 is generated at the block equalizer 16 by sequentially interleaving the plurality of related streams 20, 22, 24, 26 with equalizer probes 19.

Some current approaches are based on a non-adaptive pairing of video codec data-rate and minimum multicast waveform identification. This provides an 'unhappy medium' approach that results in many receive stations having lower video quality than necessary while other receive stations that could receive at least some useful video instead receive none at all.

As described above, the present approach may utilize a block equalizer as a way to deliver each related layer 20, 22, 24, 26 with a different SNR requirement. The block equalizer structure uses time-varying modulation to transmit the multiple related video layers. Such approach emulates the gradual video degradation of analog video signals which may be ideal for multicast/broadcast performance. Equalizer probes 19 are modulation independent, so each layer of digital video can be independently evaluated based on received SNR/CRC checking and combined with upper layer streams that are also successfully received. Standard video compression techniques may be used.

Receiver processing determines which layers may be best used for display at that receive site, allowing the receiver to automatically provide the best video quality that the channel will support, such as without negotiation with the transmitter.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A digital video communications device comprising:
a scalable video coding (SVC) controller including an encoder and associated block equalizer;
the encoder configured to
receive digital video, and
encode received digital video into a plurality of layers including a base layer having a first modulation type, and scaled enhancement layers, each scaled enhancement layer having a different modulation type from the base layer and each other scaled enhancement layer; and
the block equalizer configured to generate a waveform by sequentially interleaving the scaled enhancement layers with modulation independent equalizer probes comprising a known sequence of bits so that each scaled enhancement layer is independently evaluated based on received checking data and decoded from the base layer and each other scaled enhancement layer of the waveform upon being received and is thereafter combined with upper scaled enhancement layers.

2. The digital video communications device according to claim 1, wherein the first modulation type and the different modulation types comprise different modulation and coding schemes (MCS).

3. The digital video communications device according to claim 1, wherein the first modulation type and the different modulation types include at least a plurality of phase-shift keying (PSK) digital modulation schemes and quadrature-amplitude modulation (QAM) schemes.

4. The digital video communications device according to claim 1, wherein the scaled enhancement layers are spatially scaled.

5. The digital video communications device according to claim 1, wherein the scaled enhancement layers are temporally scaled.

6. The digital video communications device according to claim 1, wherein the scaled enhancement layers are fidelity scaled.

7. The digital video communications device according to claim 1, further comprising a digital video source configured to provide digital video to the SVC controller.

8. The digital video communications device according to claim 1, further comprising a wireless transmitter configured to transmit the waveform.

9. A digital video communications system comprising:
a transmitting unit comprising a digital video source and a scalable video coding (SVC) controller configured to
receive digital video from the digital video source,
encode received digital video into a plurality of layers including a base layer having a first modulation type, and scaled enhancement layers, each scaled enhancement layer having a different modulation type from the base layer and each other scaled enhancement layer, and
generate a waveform by sequentially interleaving the scaled enhancement layers with modulation independent equalizer probes comprising a known sequence of bits so that each scaled enhancement layer is independently evaluated based on received checking data and decoded from the base layer and each other scaled enhancement layer of the waveform upon being received and is thereafter combined with upper scaled enhancement layers; and
a receiving unit configured to receive the waveform and comprising a receiver, associated demultiplexer and a plurality of output buffers;
the receiver configured to independently decode each of the layers of the waveform; and
the demultiplexer configured to divide the decoded layers into respective output buffers.

10. The digital video communications system according to claim 9, wherein the first modulation type and the different modulation types comprise different modulation and coding schemes (MCS).

11. The digital video communications system according to claim 9, wherein the first modulation type and the different modulation types include at least a plurality of phase-shift keying (PSK) digital modulation schemes and quadrature-amplitude modulation (QAM) schemes.

12. The digital video communications system according to claim 9, wherein the scaled enhancement layers are spatially scaled with respect to resolution.

13. The digital video communications system according to claim 9, wherein the scaled enhancement layers are temporally scaled with respect to framerate.

14. The digital video communications system according to claim 9, wherein the scaled enhancement layers are fidelity scaled with respect to signal-to-noise ratio (SNR).

15. The digital video communications system according to claim 10, wherein the transmitting unit further comprises a wireless transmitter configured to transmit the waveform.

16. A digital video communications method comprising:
providing a scalable video coding (SVC) controller including an encoder and associated block equalizer;
receiving digital video at the encoder, and encoding the received digital video into a plurality of layers including a base layer having a first modulation type, and scaled enhancement layers, each scaled enhancement layer having a different modulation type from the base layer and each other scaled enhancement layer; and
generating a waveform at the block equalizer by sequentially interleaving the scaled enhancement layers with modulation independent equalizer probes comprising a known sequence of bits so that each scaled enhancement layer is independently evaluated based on received checking data and decoded from the base layer and each other scaled enhancement layer of the waveform upon being received and is thereafter combined with upper scaled enhancement layers.

17. The digital video communications method according to claim 16, wherein receiving includes the first modulation type and the different modulation types comprising different modulation and coding schemes (MCS).

18. The digital video communications method according to claim 16, wherein receiving includes the first modulation type and the different modulation types comprising at least a plurality of phase-shift keying (PSK) digital modulation schemes and quadrature-amplitude modulation (QAM) schemes.

19. The digital video communications method according to claim 16, wherein receiving includes the scaled enhancement layers being spatially scaled.

20. The digital video communications method according to claim 16, wherein receiving includes the scaled enhancement layers being temporally scaled.

21. The digital video communications method according to claim 16, wherein receiving includes the scaled enhancement layers being fidelity scaled.

22. The digital video communications method according to claim 16, further comprising providing the digital video to the SVC controller from a digital video source.

23. The digital video communications method according to claim 16, further comprising transmitting the waveform with a wireless transceiver.

* * * * *